(12) United States Patent
Saenz

(10) Patent No.: US 7,402,746 B2
(45) Date of Patent: Jul. 22, 2008

(54) TRAINING APPARATUS FOR LEARNING TO PLAY THE GUITAR

(76) Inventor: Adrian Saenz, 8020 Bowen Rd., El Paso, TX (US) 79915

( * ) Notice: Subject to any disclaimer, the term of this patent is extended or adjusted under 35 U.S.C. 154(b) by 71 days.

(21) Appl. No.: 11/592,532

(22) Filed: Nov. 3, 2006

(65) Prior Publication Data

US 2008/0105108 A1   May 8, 2008

(51) Int. Cl.
*G10H 7/00* (2006.01)
*G10H 1/32* (2006.01)
*A63J 17/00* (2006.01)
*A63J 5/10* (2006.01)

(52) U.S. Cl. .............................. 84/726; 84/600; 84/602; 84/604; 84/609; 84/644; 84/646; 84/649; 84/670; 84/267; 84/314 R; 84/464 R; 84/464 A; 84/470; 84/485 R

(58) Field of Classification Search .................. 84/602, 84/604–607, 609–620, 634–638, 645–656, 84/666–670, 692–700, 712–717, 723–727, 84/735, 736, 464 R, 464 A, 470 R, 477 R, 84/485 R
See application file for complete search history.

(56) References Cited

U.S. PATENT DOCUMENTS

| 3,178,501 | A |   | 4/1965 | Evans |  |
|---|---|---|---|---|---|
| 4,132,143 | A |   | 1/1979 | Stone |  |
| 4,286,495 | A | * | 9/1981 | Roof | 84/485 R |
| 4,318,327 | A | * | 3/1982 | Toups | 84/477 R |
| 4,559,861 | A | * | 12/1985 | Patty et al. | 84/470 R |
| 4,791,848 | A | * | 12/1988 | Blum, Jr. | 84/453 |
| 4,807,509 | A | * | 2/1989 | Graham | 84/314 R |
| D309,468 | S |   | 7/1990 | Everett |  |
| 5,408,914 | A | * | 4/1995 | Breitweiser et al. | 84/477 R |
| 6,191,348 | B1 | * | 2/2001 | Johnson | 84/485 R |
| 6,452,081 | B1 | * | 9/2002 | Ravagni et al. | 84/477 R |
| 2002/0005111 | A1 | * | 1/2002 | Ludwig | 84/645 |
| 2004/0182219 | A1 | * | 9/2004 | Sasaki | 84/100 |
| 2004/0187673 | A1 | * | 9/2004 | Stevenson | 84/737 |
| 2004/0244566 | A1 | * | 12/2004 | Steiger | 84/610 |
| 2005/0183566 | A1 | * | 8/2005 | Nash | 84/601 |

* cited by examiner

*Primary Examiner*—Lincoln Donovan
*Assistant Examiner*—Christopher Uhlir
(74) *Attorney, Agent, or Firm*—Raymond M. Galasso; Galasso & Associates, LP

(57) ABSTRACT

A training apparatus for guiding and independently teaching a user to quickly play a guitar by interpreting stored encoded MIDI music data to guide the user's hands by illuminating sequences of desired finger positions on the frets of a guitar to play the music.

13 Claims, 10 Drawing Sheets

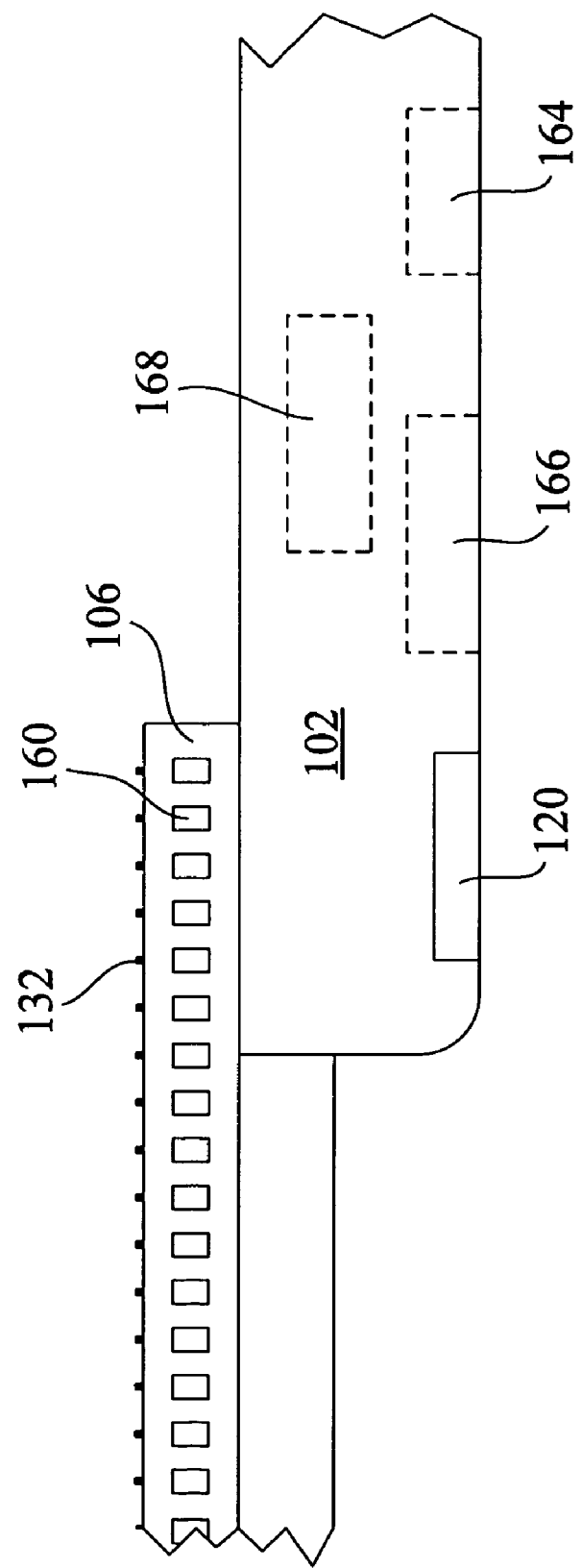

FIG. 6

| PITCH | FREQ | MIDI | PITCH | FREQ | MIDI |
|---|---|---|---|---|---|
| E3 | 164.814 | 52 | C6 | 1046.502 | 84 |
| F3 | 174.614 | 53 | C#6 | 1108.731 | 85 |
| F#3 | 184.997 | 54 | D6 | 1174.659 | 86 |
| G3 | 195.998 | 55 | D#6 | 1244.508 | 87 |
| G#3 | 207.652 | 56 | E6 | 1318.510 | 88 |
| A3 | 220.000 | 57 | F6 | 1396.913 | 89 |
| A#3 | 233.082 | 58 | F#6 | 1479.978 | 90 |
| B3 | 246.942 | 59 | G6 | 1567.982 | 91 |
| C4 | 261.626 | 60 | G#6 | 1661.219 | 92 |
| C#4 | 277.183 | 61 | A6 | 1760.000 | 93 |
| D4 | 293.665 | 62 | A#6 | 1864.655 | 94 |
| D#4 | 311.127 | 63 | B6 | 1975.533 | 95 |
| E4 | 329.628 | 64 | | | |
| F4 | 349.228 | 65 | C7 | 2093.005 | 96 |
| F#4 | 369.994 | 66 | C#7 | 2217.461 | 97 |
| G4 | 391.995 | 67 | D7 | 2349.318 | 98 |
| G#4 | 415.305 | 68 | D#7 | 2489.016 | 99 |
| A4 | 440.000 | 69 | E7 | 2637.021 | 100 |
| A#4 | 466.164 | 70 | | | |
| B4 | 493.883 | 71 | | | |
| | | | | | |
| C5 | 523.251 | 72 | | | |
| C#5 | 554.365 | 73 | | | |
| D5 | 587.330 | 74 | | | |
| D#5 | 622.254 | 75 | | | |
| E5 | 659.255 | 76 | | | |
| F5 | 698.457 | 77 | | | |
| F#5 | 739.989 | 78 | | | |
| G5 | 783.991 | 79 | | | |
| G#5 | 830.609 | 80 | | | |
| A5 | 880.000 | 81 | | | |
| A#5 | 932.328 | 82 | | | |
| B5 | 987.767 | 83 | | | |

TRAINING APPARATUS FOR LEARNING TO PLAY THE GUITAR

FIELD OF THE DISCLOSURE

The disclosures made herein relate generally to apparatus for training a user to play a stringed musical instrument and, more particularly, to a training apparatus for guiding and independently teaching a user to quickly play a guitar by interpreting encoded MIDI music data to guide the user's hands by illuminating sequences of desired finger positions on the frets of a guitar to play the music.

BACKGROUND

As a substitute for reading musical staff notation, it is known for a beginner student to learn the guitar by following a printed chord diagram, known as tablature, to determine positions to place the fingers on specific strings and frets corresponding to desired chords or melodic lines to be played.

A limitation of this method of learning to play the guitar (Tabs) is that the use of a chord diagram is highly visual, awkward and time consuming as the user must repeatedly move the visual attention from sheet music to the chord diagram to the guitar fret board and back to properly position the fingers and play the sequence of chords.

Another method of learning to play the guitar is with the guided help of a guitar instructor. The instructor may attempt to teach the student by demonstrating the placement of the fingers on the strings and frets and guiding the students hand for proper placement. A limitation of the use of a hired instructor is that instruction can be expensive, can not be performed independently and is only available at certain scheduled times (when the instructor is available to teach).

Method books and instructional videos are available but can be very difficult to comprehend, especially if the person is musically illiterate. Most instructional books and videos require a basic understanding of music notation. For a person that simply wishes to learn to play the guitar and not interested in becoming a professional musician, method books and instructional videos can be difficult to understand, follow and frustrating to learn from independently.

Therefore, apparatus for training a user to play a guitar that permits the student to learn and practice according to their own schedule, a guitar training apparatus that is equipped to accept, play and interpret encoded MIDI music files using the MIDI data to visually illustrate sequences of correct finger placement on strings and frets to play the MIDI music, a guitar training apparatus that can teach a user to play music and songs on the guitar without resorting to printed musical scores, a guitar training apparatus that is less awkward and more time efficient than traditional guitar learning methods thereby allowing the student to progress quickly, such a guitar training apparatus would be useful and novel.

SUMMARY OF THE DISCLOSURE

Accordingly, embodiments of the inventive disclosures made herein comprise various embodiments of a training apparatus for learning to play the guitar which utilizes encoded MIDI data to interpret into a sequence of illuminated finger positions on frets of a six string guitar neck to guide the user to play the chords scales and melodic/harmonic lines on the guitar.

The guitar has been a popular instrument for many centuries. There are many reasons why some people never learn to play the guitar. One of the popular reasons is the difficulty involved in trying to place the fingers on the proper strings and frets. Pressing a string on a fret shortens the length of the instrument string, adjusting the frequency at which it vibrates and the sound pitch it produces. Proper finger placement is key to accomplishing the desired sound. Sometimes those seeking to learn to play the guitar do not wish to pay an instructor to teach them how to play the guitar, so they just play it without ever mastering the true techniques.

An objective of this disclosure is to provide an apparatus for training a user to play a guitar without the aid of a teacher or instructor. The apparatus disclosed herein has a fret board using fiber optic wave guides positioned to illuminate, in different colors, fret positions on the fret board of the guitar to guide the user to the proper fingerings and finger placement. The disclosed guitar training apparatus actually guides and teaches the user how to play the guitar.

In a first embodiment the training apparatus for learning to play the guitar comprises a training musical instrument in the general form of a guitar having a body, an elongated neck secured to the body, a fret board having 24 frets spaced along and secured onto the fret board with the fret board itself secured to the neck. The apparatus further includes a headstock having six adjustable machine heads for receiving, adjusting and tuning guitar strings, a bridge secured to the body, at least one electronic pickup secured to the body, and six instrument strings extending and tensioned between the machine heads and the bridge. To extend the guitar as a training instrument, the training apparatus for learning to play the guitar includes an electronic computer based logic system secured within the body of the guitar. A plurality of light emitting or illuminated panels between the frets are secured to the fret board positioned to illuminate, in different colors, fingerings and finger locations of these spaces, specifically at locations on the fret board where instrument strings cross over frets. The light is conducted to the fret positions by the use of fiber optic light guides so that the entire space or part of the space between the frets light up. The illuminated fiber optics are interfaced to and controlled by the electronic computer based logic system and are sequentially illuminated during playback of encoded MIDI data to indicate the changing finger placement positions required of the student or user to play the chords, melodic/harmonic lines of the music. In a six string guitar there are six fiber optic panels at each fret (one for each string), and a total of 24 frets on the fret board. The fret board is itself secured onto the neck of the guitar. An operating system, application and data storage means consisting of a hard disk is secured within the body of the guitar and interfaced to the computer based logic system. Among other things, the hard disk stores encoded MIDI music files to be played and interpreted by the training apparatus to illuminating fret finger positions during practice. The hard disk also holds instructional exercises. The guitar training apparatus includes a backlit graphic display screen mounted and hinged to the guitar body. The display is attached such that it can be tilted to a position suitable for viewing by the user playing the guitar. In the case of a transparent guitar the display may be secured internally, within the guitar and positioned at an angle that is easily viewed by the player. The screen displays information including status, controls, options, musical scores, staff notation, and tablature to the user. A control and edit panel is secured to the body of the guitar and interfaced to the computer based logic system. The control and edit panel includes controls to adjust tempo, metronome clicks, to affect editing including transposition and repetition, as well as controlling what is displayed on backlit display screens attached to the side of the fret board near each fret or in the spaces between the frets for each string (discussed later).

A plurality of external interface connectors are secured to the body of the guitar and interfaced to the electronic logic system. The interface connectors include at least one universal serial bus (USB) port for interfacing the guitar to a computer, as well as at least one FireWire serial bus interface port again for interfacing to a computer. The USB and FireWire interfaces permit encoded MIDI files to be exchanged between an external computer system and the computer based logic system of the guitar training apparatus. Encoded MIDI files are readily available on the Internet from sites such as 'mysongbook.com'. MIDI is a music information exchange standard overseen by the International MIDI Association (IMA). Additionally, music scores may be recorded on the guitar training apparatus then transferred to an external computer over either the USB port or FireWire. FireWire (also known as iLink or IEEE 1394) is a personal computer (and digital audio/digital video) serial bus interface standard offering high-speed communications and isochronous real-time data services between connected devices.

Additional interface connectors on the guitar training apparatus include at least one RCA type analog audio input connector and at least one RCA type analog audio output connector. The RCA connectors are conventional analog audio in and audio out connectors such as found on stereo equipment. At least one Sony/Philips digital interface (S/PDIF) digital audio interface connector is provided on the guitar body. S/PDIF or S/P-DIF stands for Sony/Philips Digital Interface Format, also IEC 958 type II, part of IEC-60958. It is a collection of hardware and low-level protocol specifications for carrying PCM stereo digital audio signals between devices and stereo components. An optical data input connector and an optical data output connector are also provided for interfacing the guitar instruction apparatus to external music sources and players. A musical instrument digital interface (MIDI) connector is provided on the body of the guitar, providing a standard MIDI interface to external computers and MIDI devices. Additionally, a conventional headphone jack is provided for playing and practicing the guitar without disturbing others.

An audio speaker is secured to the guitar body and interfaced to the electronic logic system in the guitar body. The guitar body includes a recessed flash memory card receptacle with an electronic interface adapted for receiving standard flash memory cards. The flash memory card is useful for storing recorded music, encoded MIDI music, lessons, exercises, as well as providing another means of moving files between an external computer and the guitar training apparatus. The guitar training apparatus can by powered from an internal rechargeable battery pack or powered by an AC adapter.

In one or more embodiments the training apparatus for learning to play the guitar includes computer executable code to provide audio format conversions between audio formats including MP3, MIDI and WAV.

In one or more embodiments the training apparatus for learning to play the guitar includes electrically driven self adjusting, tension monitoring tuning machine heads, such as the self tuning guitar tuning system marketed by Tronical GmbH of Hamburg, Germany.

The computer based logic system utilizes inputs from the electronic pickups to measure the tuned frequency of the six open instrument strings and adjust the tension of the strings for the desired pitch to maintain the guitar in tune. In other embodiments the heads are adjusted manually using conventional tuning pegs with each head having three LEDs positioned about the head, one LED indicating the string is in tune, another indicating the string is flat, and a third indicating the string is sharp.

In one or more embodiments of training apparatus for learning to play the guitar, the guitar body, fret board and neck are of a light weight material such as fiberglass or plastic, polymer, and other synthetic fibers In one or more embodiments the apparatus for training a user to play the guitar, the guitar fret board is made of transparent fiberglass, plastic, polymer, and other synthetic fibers.

In one or more embodiments the apparatus for training a user to play the guitar, the illuminated panels secured to or within the fretboard between the frets, are of the multicolored variety wherein the illuminated spaces and different colors indicates to the user which particular finger is to be used to depress on the illuminated fret/string position. In certain embodiments using this concept, the multi-color spaces are electronically selectable to illuminate in blue, green, yellow, or red, wherein blue indicates index finger, green indicates middle finger, yellow indicates ring finger and red indicates pinky finger.

In one or more embodiments of the teaching apparatus for training a user to play the guitar, a side edge of the fret board includes a plurality of backlit LCD displays. Each fret has a LCD display associated with it and each LCD display is secured to the side of the fret board proximate to its associated fret. Each LCD display and its backlight are electronically interfaced to the electronic logic system such that the electronic control logic system can activate symbols, numbers indicating scales degrees, pitch name, and other musical symbols on the LCD displays.

In one or more embodiments the apparatus for training a user to play the guitar includes a plurality of backlit screens, wherein each fret has a backlit screen associated with it. The backlit screens are secured with in the spaces between each fret on the fretboard and electronically interfaced to the electronic logic system such that wherein each backlit screen is electronically selectable by the electronic logic control system to illuminate in blue, green, yellow, and red to indicate which finger to place on the fret, wherein blue indicates index finger, green indicates middle finger, yellow indicates ring finger and red indicates pinky finger. Backlighting can also be controlled according to the rhythm or tempo of the music.

The disclosed training apparatus for learning to play the guitar teaches the owner how to play it. Through the use of illuminated panels and in some cases fiber optics, the fret positions on the fret board are illuminated to indicate where to place the fingers next and exactly which frets to press down and play. The backlit LCD displays located near each fret on the fret board indicate through colors, symbols, number, initials which fingers to use (right/left hand), pitch names, scale/chord/degrees, etc. The fret LCD displays or backlit LCD screens light up and blink in sync with the rhythms. The tempo of the rhythm, as well as many other musical properties, may be controlled through the control and edit panel on the guitar body for training purposes. The guitar training apparatus also has a hard disk drive. Encoded MIDI files can be downloaded over the Internet to the hard disk drive (though a USB or FireWire connected external computer). Also to be available are downloads of methods, instructions, step by step from beginner to advanced level exercises, all downloadable to the hard drive of the guitar training apparatus. The methods may include all possible chords, scales, jazz chord progressions, techniques, and instructional exercises. Software for a PC or laptop is provided with the guitar training apparatus, the software to perform audio conversions between various common formats (WAV, MP3 and encoded MIDI for example), as well as for recording and transferring data between the computer and the guitar training apparatus, saving data to the computer, composing, printing sheet music at the computer. The edit and control panel on the guitar body permits the user to control musical aspects of playback and recording including tempo, metronome clicks, transposition, repetition as well as what is displayed on the backlit LCD screens near each fret. The LCD displays at each fret are configurable by the user to display several musical properties including pitch name, scale degrees, and fingers to use on both left and right hands.

It is an objective of the inventive disclosure made herein to provide a guitar training apparatus for training a user to play the guitar that permits the student to learn and practice according to their own schedule.

It is another objective of the inventive disclosure made herein to provide guitar training apparatus for training a user to play the guitar that is equipped to accept, play and visually interpret (by string and fret illumination) encoded MIDI music files such that the user can learn to play these music pieces on the guitar.

It is an objective of the inventive disclosure made herein to provide a guitar training apparatus that can teach a user to play music and songs on the guitar without resorting to printed musical scores nor requiring the user to be able to read and comprehend musical printed scores.

It is an objective of the inventive disclosure made herein to provide guitar training apparatus that is less awkward and more time efficient than traditional guitar learning methods thereby allowing the student to progress quickly.

The guitar training apparatus is a useful tool for knowledgeable, experienced, advanced guitarists as it can store information such as: all possible chords, chord progressions and scales. In can store a library of information (data) that is easily accessible and easily recalled. No need to carry around chord/charts. It is able to record and store songs played on it and transfer such data into computer software for printing sheet music, mixing tracks, transposition, etc. With it's many ways of transferring and sharing such data, it can basically connect to pretty much anything making it perfect for studio and recording applications.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

FIG. 2A the entire spaces light up. FIG. 2B just the front half of the spaces light up to indicate correct finger placement.

FIG. 4 depicts a top side view (relative to the user during guitar use) of a guitar neck and fret board showing the backlit screens located near each fret in accordance with certain embodiments of the present inventive disclosure.

FIG. 6 depicts musical pitches, MIDI numbers and frequencies (Hz) corresponding to the pitches depicted in FIG. 5.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
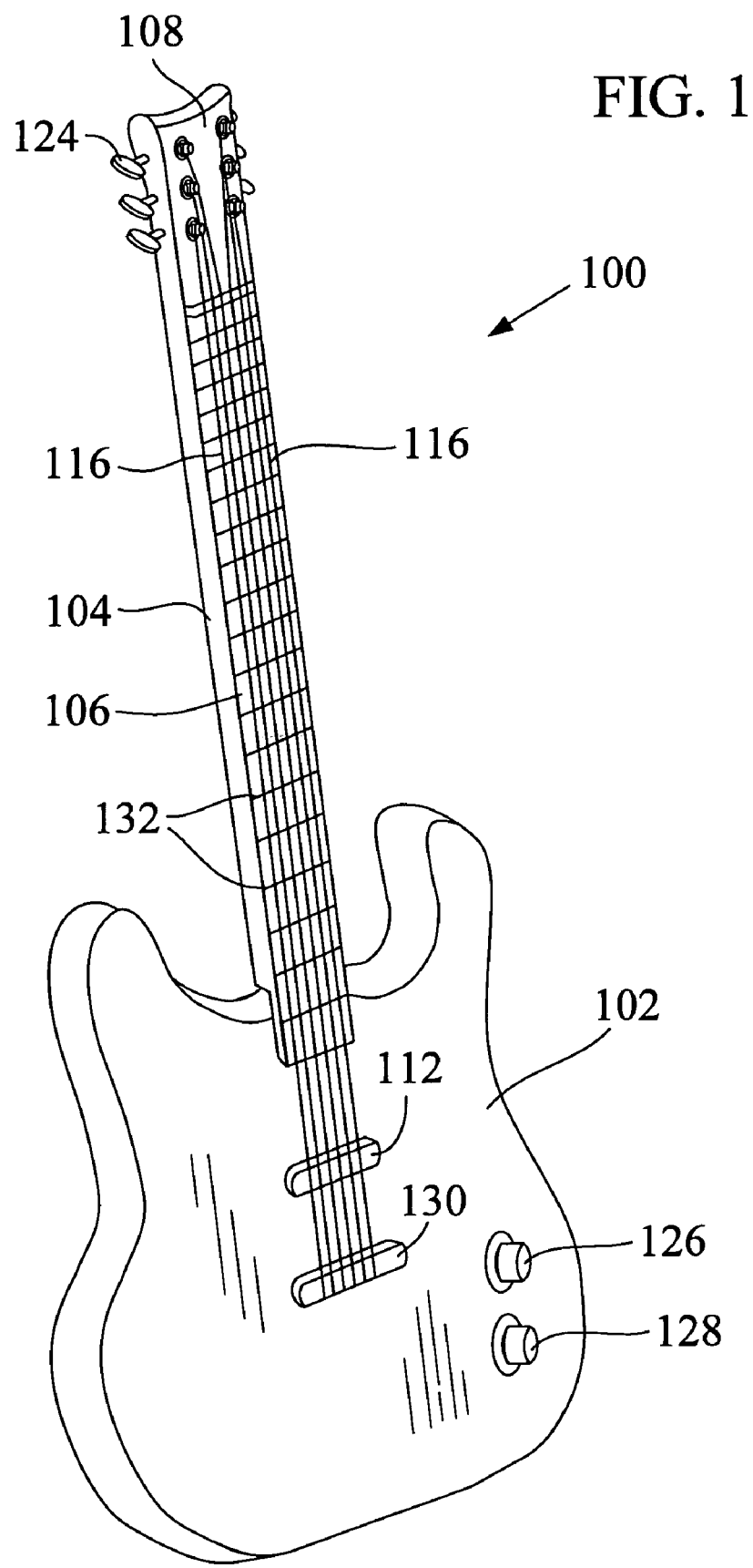
FIG. 1 depicts a perspective view of an electronic guitar equipped with features of the present inventive disclosure.
Figure 2A:
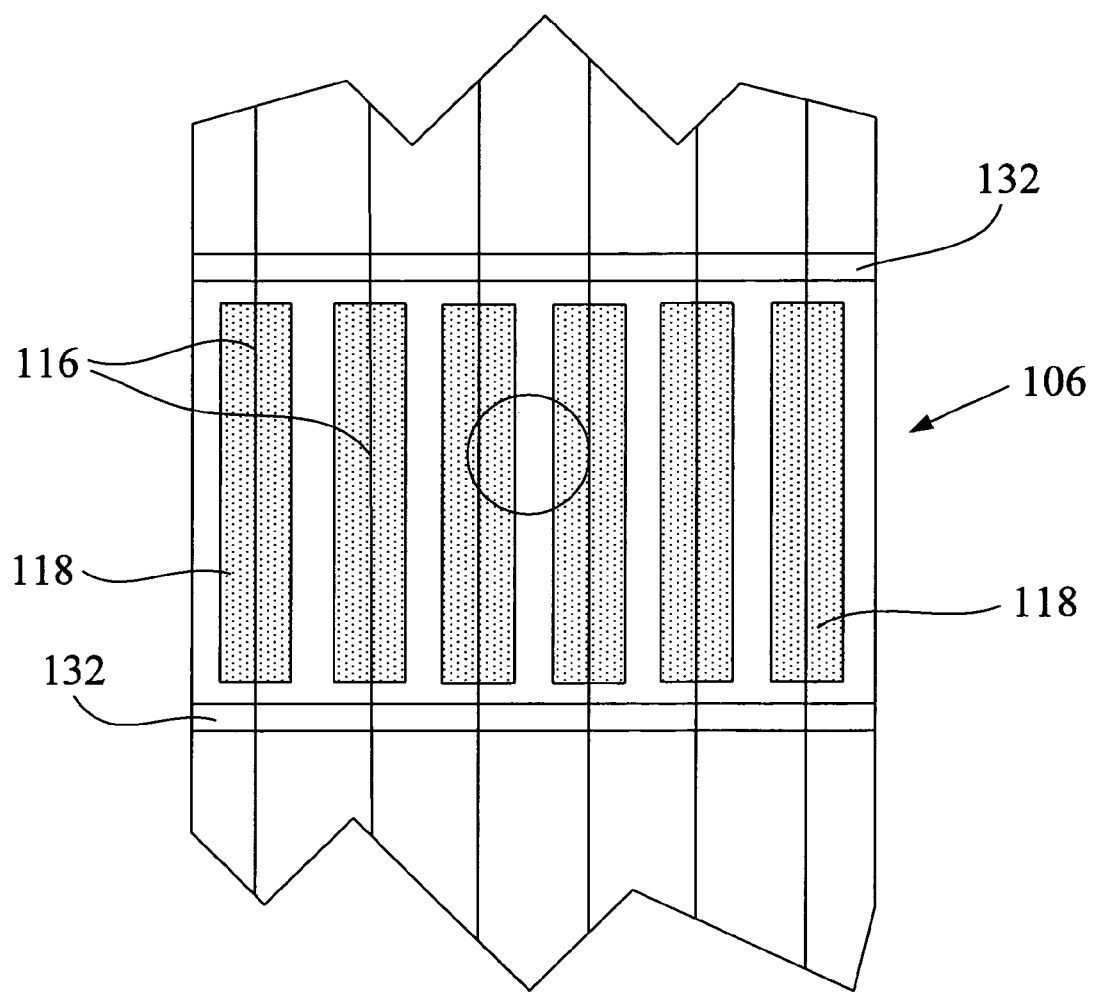
FIGS. 2A and 2B depicts a close up view of two embodiments of the fretboard of the guitar of FIG. 1 depicting the illuminated panels between the frets which illuminate in different colors as needed during practice to illustrate to the user where to place fingers on frets and strings as well as which fingers to use. The illuminated spaces may also display numbers, symbols, characters to identify musical properties such as pitch, scale degrees, etc.
Figure 2B:
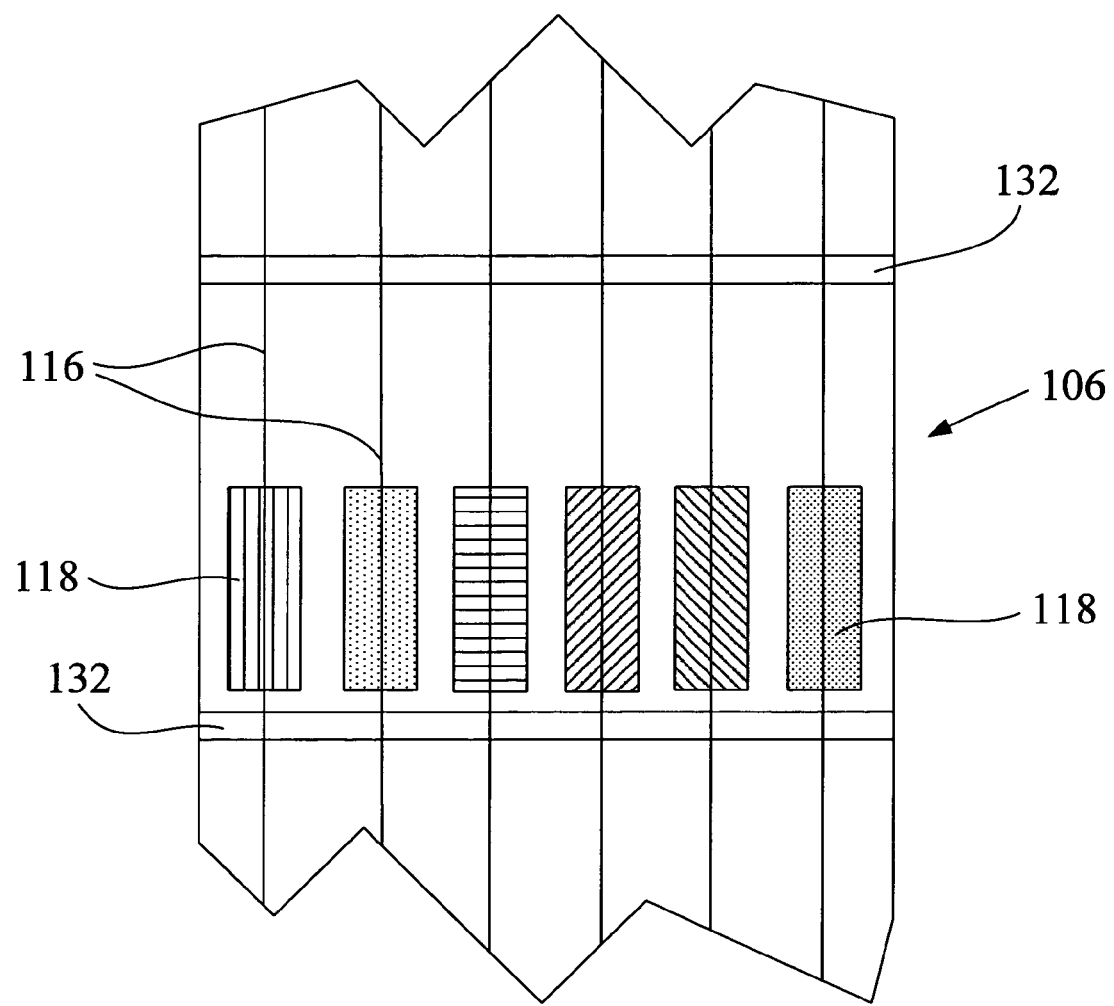
Figure 3:
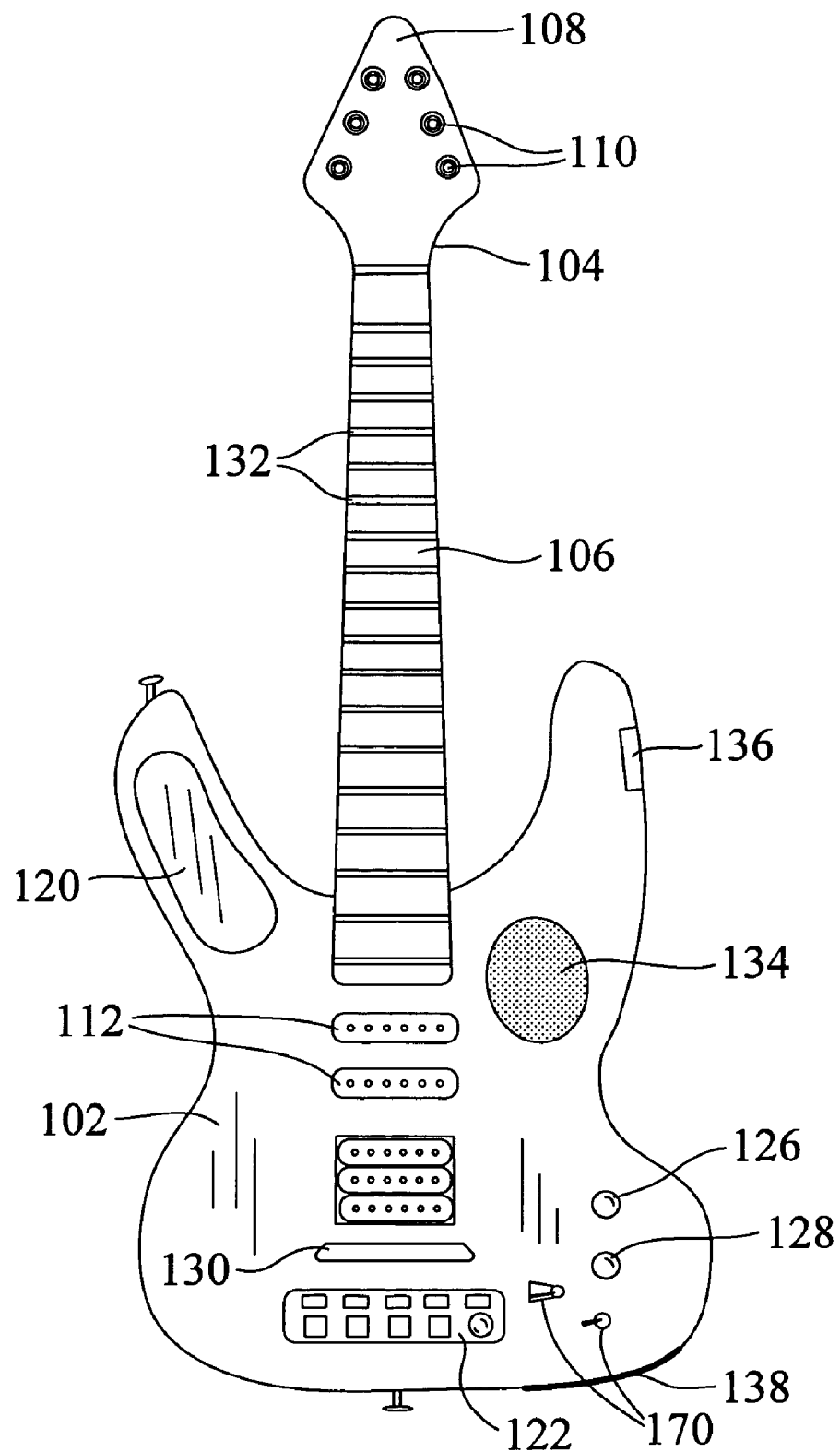
FIG. 3 depicts a top view of an electronic guitar equipped with features of the present inventive disclosure including backlit graphic display, control edit panel, and built in speaker, and a memory flash card receptacle/input/output control panel.

Turning now to FIG. 1, FIG. 2A and FIG. 2B:

FIG. 1 depicts a perspective view of an electronic guitar equipped with features of the present inventive disclosure. FIG. 2 depicts a close up view of the fretboard of the guitar of FIG. 1 depicting the string/transparent spaces between the frets which illuminate (illuminated panels) according to the MIDI chords during practice to illustrate to the user where to place finger on frets and strings. FIG. 2A and FIG. 2B present two embodiments of the illuminated panels 118 in the spaces between the frets 132. In FIG. 2A the illuminated panels 118 are sized to substantially fill the space between the frets 132. In FIG. 2B the illuminated panels 118 are of a of a size occupying roughly half the space between the frets 132. The training apparatus for learning to play the guitar 100 has a guitar body 102, elongated neck 104 secured to the body, an headstock 108 secured to an end of the neck 104. The headstock includes six adjustable machine heads 124 which tension and adjust the instrument strings 116. The guitar body includes one or more electronic pickups 112 under the strings, a bridge 130 secured to the body and tensioning the end of the strings opposite the machine heads 124. Also shown in FIG. 1 is the volume control 126, tone control 128. FIG. 2A and FIG. 2B illustrate the illuminated finger position indicators (transparent illuminated panels between frets 118) located proximate to the frets 132. The illuminated panels 118 are the transparent spaces between the frets secured to the fret board 106. If the fret board is transparent, the illuminated panels 118 may be located within the fret board FIG. 3 depicts a top view of an electronic guitar equipped with features of the present inventive disclosure including backlit graphic display 120, control edit panel 122, pickups 112, speaker 134, volume 126, pickup selectors 170 and tone control 128. The backlit graphic display 120 is hingeably secured to the guitar body 102 such that the graphic display can be opened away from the body and tilted to a position at which the user playing the guitar can easily view the graphic display. If the guitar is transparent, then the graphic display is installed within the guitar (internally) and at an angle that is easily viewed by the player. A memory card receiver/receptacle 136 is built into the guitar body 102 to provide for the use of a flash memory card as one means of transferring music files such as WAV, MP3, encoded MIDI files and other files between the guitar training apparatus 100 and other external devices such as computers.

Figure 3A:
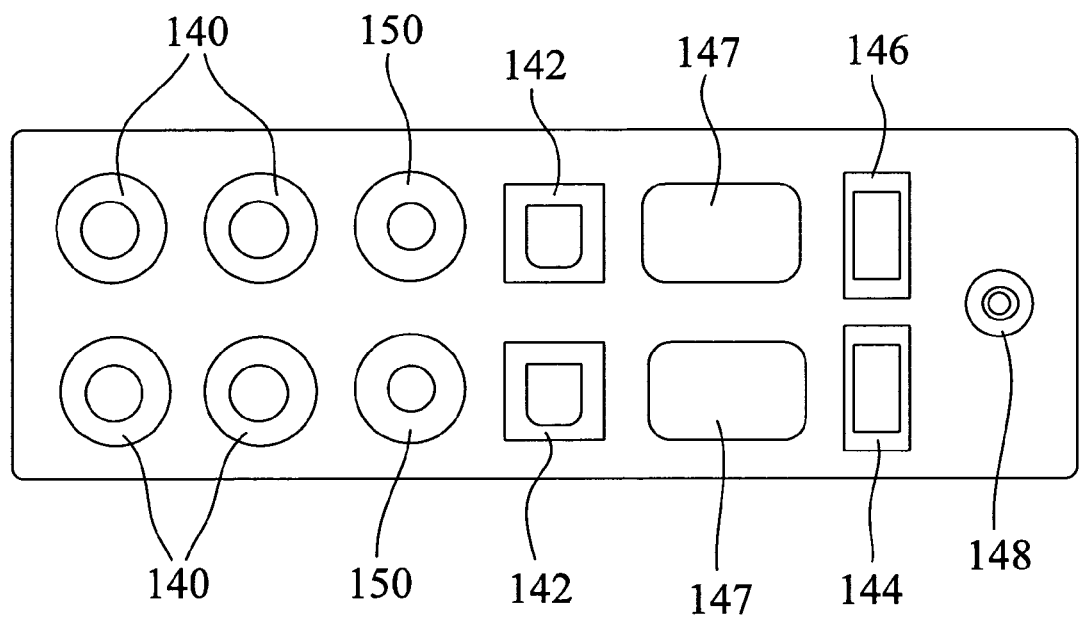
FIG. 3A depicts a zoom view of the bottom edge of the base of the guitar of FIG. 3, illustrating the input/output connector panel.

FIG. 3A depicts a zoom view of the bottom edge of the body 102 of the guitar 100 of FIG. 3, illustrating the input/output connector panel 138. The input/out panel 138 has connectors for RCA analog in and out 140, optical in and out 142, Sony/Philips digital interface (S/PDIF) in and out 150, FireWire 144, USB connector 146, at least one MIDI in/out connector 147, and headphone jack 148.

Figure 3B:
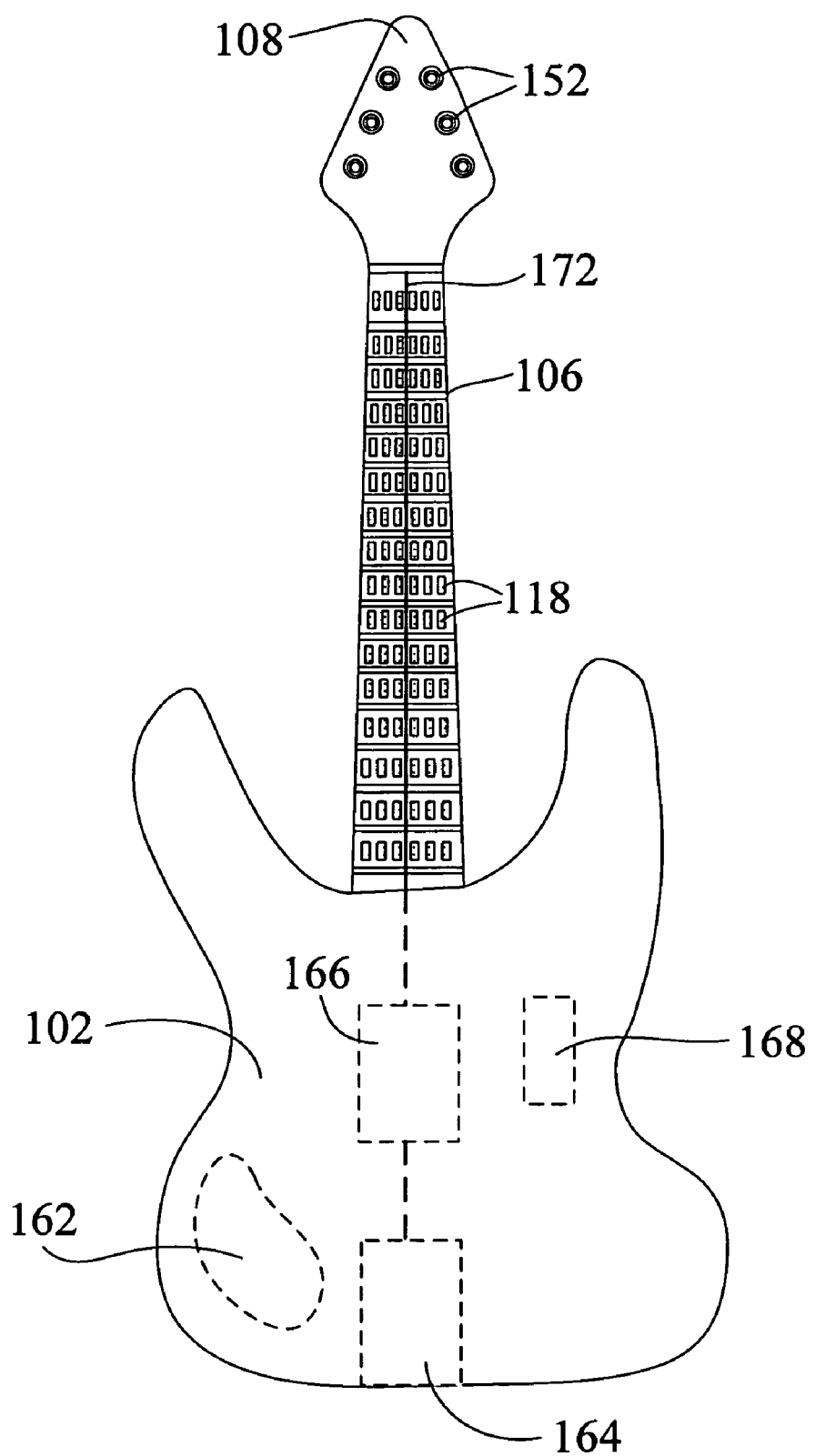
FIG. 3B depicts a zoom view of a guitar headstock equipped with electrically driven self adjusting tuning machine heads in accordance with certain embodiments of the present inventive disclosure.

FIG. 3B depicts a top view of an electronic guitar, similar to the guitar in FIG. 3 but with electrically driven self adjusting machine heads 152 for adjusting the instrument strings. volume/tone control and pick up selectors panel 162 secured to the body 102 of the guitar. Hard drive 164, interfaced to electronic computer based logic system 166, both secured within the body 102 of the guitar. Transparent fiber optic illuminating spaces between the frets 118 secured to the fret board 106. A rechargeable battery pack 168 secured within the guitar body 102, and a wire harness 172 interconnecting the transparent illuminating spaces between the frets 118 to the electronic computer based logic system 166, and continuing to the head stock 108. In this figure the fret board 106 is made of a transparent material, and the transparent illuminating spaces between the frets are mounted internally in the fret board and illuminating through the transparent material of the fret board. The self adjusting heads 152 rely upon frequency measurement from the electronic pickups (see 112 of FIG. 3) of the six open instrument strings and automatically adjust the tension of the strings for the desired pitch to 20 maintain the guitar in tune.

Figure 3C:
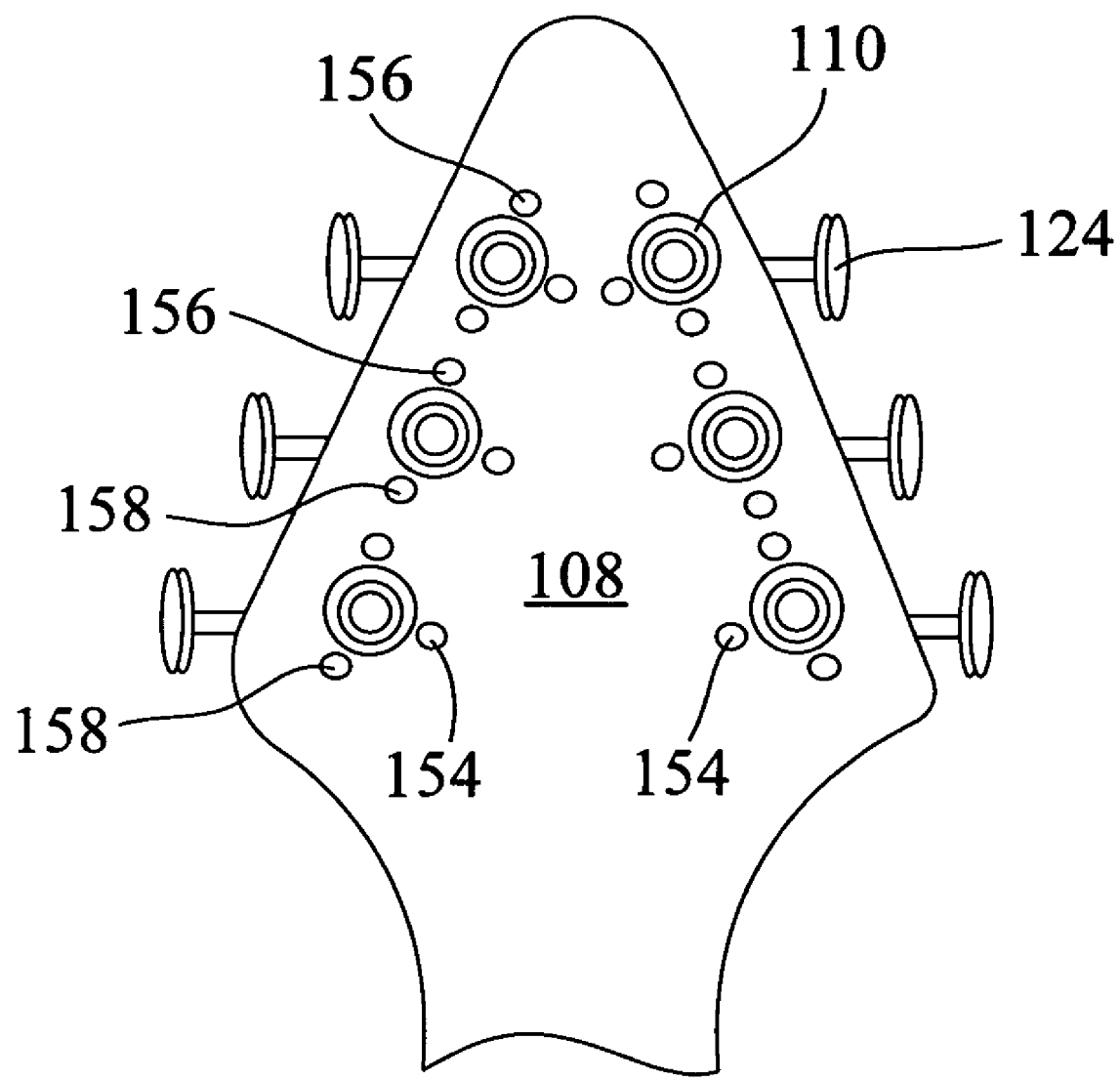
FIG. 3C depicts a zoom view of a guitar headstock equipped with manually driven self tuning machine heads including in-tune, sharp and flat illuminated indicators in accordance with certain embodiments of the present inventive disclosure.

FIG. 3C depicts a zoom view of a guitar headstock 108 equipped with manually driven self tuning machine heads 110 including in-tune 154, sharp 158 and flat 156 illuminated indicators located proximate to each machine head 110 in accordance with certain embodiments of the present inventive disclosure. The heads 110 are adjusted by conventional tuning pegs 124, with each head having the in-tune 154, sharp 158 and flat 156 illuminated indicators (in some embodiments LEDs) positioned about each head. The indicators provide a visual feedback of the detected frequency of each fingered string permitting the user to manually tune the strings with the tuning pegs 110 until the in-tune indicators 154 confirm the strings are in tune.

FIG. 4 depicts a top side view of a guitar neck, fret board, and body showing the backlit screens 160 secured to the side of the fret board 106 located in the spaces before each fret 132 in accordance with certain embodiments of the present inventive disclosure. Note that in FIG. 4 a number of backlit screens 160 are shown, but it is to be understood that each fret has a backlit screen associated with it. Hard drive 164, interfaced to electronic computer based logic system 166, both secured within the body 102 of the guitar. A rechargeable battery pack 168 is secured within the guitar body 102. The backlit LCD graphic screen 120 as described previously is interfaced with the electronic computer based logic system 166.

Figure 5:
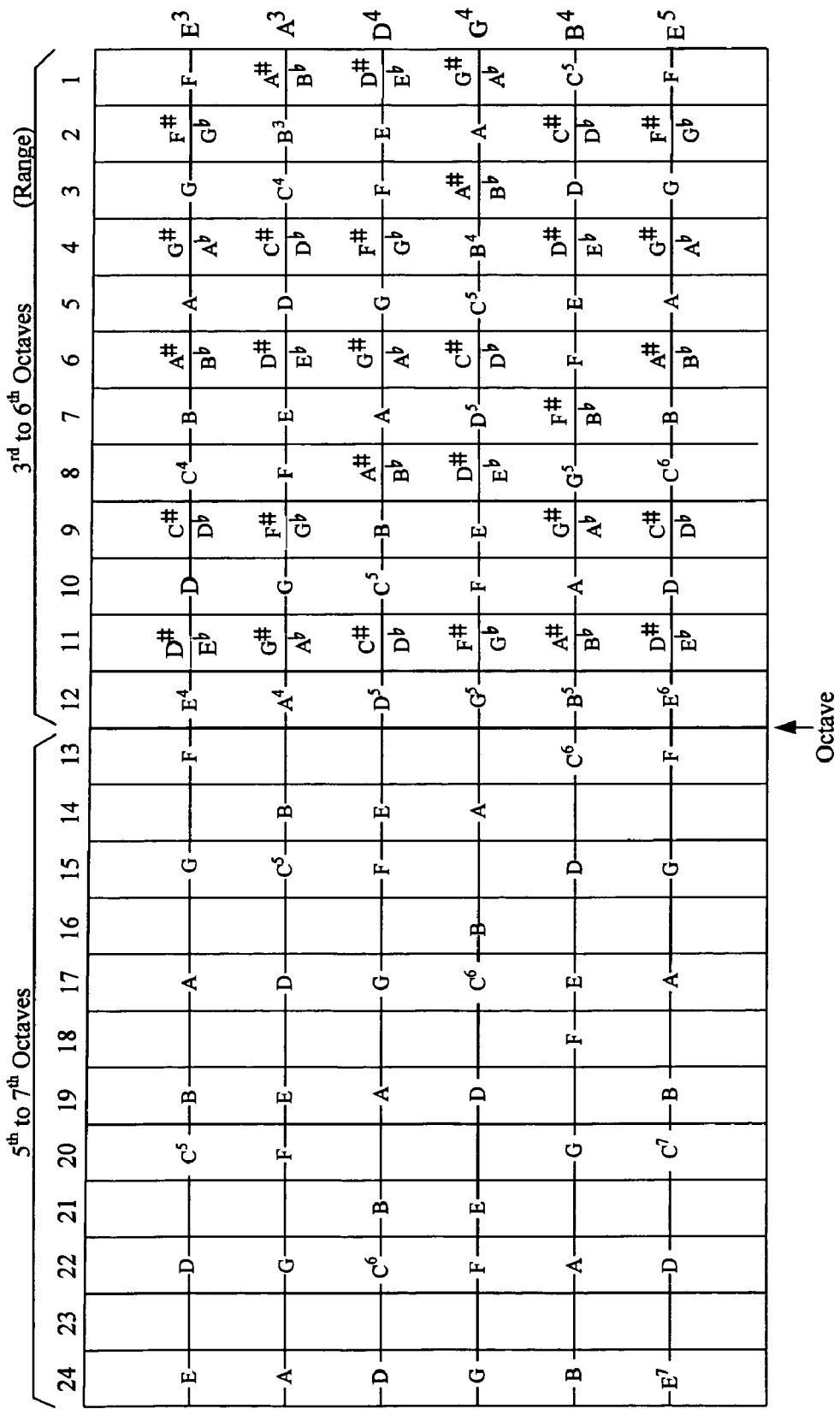
FIG. 5 depicts musical pitches of fret/string positions on the guitar fret board in standard tuning.

FIG. 5 depicts musical pitches of corresponding fret/string positions on the guitar fret board.

FIG. 6 depicts musical pitches, MIDI numbers and frequencies (Hz) corresponding to the pitches depicted in FIG. 5, showing the relationship between MIDI numbers in encoded MIDI files and string finger positions to be illuminated on the fretboard.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A self teaching apparatus for training a user to play a guitar by converting encoded MIDI music data into a user guiding sequence of illuminated finger positions on frets of a six string guitar, the apparatus comprising:
   a guitar comprising:
      a body;
      a neck secured to the body;
      a fret board having 24 frets spaced along and secured onto the fret board, the fret board secured to the neck;
      a headstock secured to an upper portion of the neck;
      six adjustable machine heads for receiving, adjusting and tuning guitar strings, the heads secured to the headstock;
      a bridge secured to the body;
      at least one electronic pickup secured to the body; and
      six strings extending and tensioned between the machine heads and the bridge;
   an electronic computer based logic system secured within the body of the guitar, the logic system comprising:
      a programmable logic processor; and
      a memory means comprising at least one memory device;
   a plurality of light emitting transparent panels secured to the fret board between the frets, wherein the transparent panels illuminate to indicate finger placement positions during a practice session, and are configured to display other indicators including symbols, numbers, characters, and musical symbols to identify musical properties including pitch, interval, and scale degree, the panels interfaced to the electronic computer based logic system;
   a hard disk secured within the body of the guitar, the hard disk storing encoded MIDI music, instructional exercises and references, the hard disk interfaced to the electronic logic system;
   a backlit graphic display screen, the screen secured to the body, the display screen viewable by the user playing the guitar, the display electronically interfaced to the electronic logic system, the screen for displaying status, controls, options, musical scores, staff notation, tablature;

a control and edit panel secured to the body of the guitar, the panel including controls for tempo, metronome clicks, transposition, repetition, play, stop, pause, rewind, fast forward, cue, paste, cut and record;

a plurality of interface connectors secured to the body and interfaced to the electronic logic system, the interface connectors comprising:

at least one universal serial bus (USB) port for interfacing to a computer;

at least one FireWire serial bus interface port for interfacing to a computer;

at least one RCA type analog audio input connector;

at least one RCA type analog audio output connector;

at least one Sony/Philips digital interface (S/PDIF) digital audio interface connector;

an optical data input connector;

an optical data output connector;

at least one musical instrument digital interface (MIDI) connector for interfacing to a computer;

an audio output connector for attaching headphones; and an audio output connector for connection to an external amplifier;

an audio speaker secured to the guitar body and interfaced to the electronic logic system;

a recessed flash memory card receptacle with electronic interface, the flash memory card receptacle secured to the guitar body, the receptacle for receiving a flash memory card, the flash memory card for storing recorded music, encoded MIDI music, lessons, exercises; and a rechargeable battery pack secured within the guitar body, the battery pack for powering the self instructional apparatus.

2. The self teaching apparatus for training a user to play a guitar of claim 1, further comprising computer executable code having features including:

audio format conversion between audio formats including MP3, MIDI and WAV;

file transfer between the apparatus and an external computer;

recording of guitar practice sessions; and composing and printing sheet music at the computer.

3. The self teaching apparatus for training a user to play a guitar of claim 1, further comprising:

electrically driven self adjusting tuning machine heads wherein the electronic computer based logic system calculates the pitch of each guitar string through the electronic pickup and adjusts the tension of the string for the desired pitch to maintain the guitar in tune.

4. The self teaching apparatus for training a user to play a guitar of claim 1, further comprising:

a plurality of tuning pegs, one tuning peg for each machine head, wherein turning the peg adjusts the tension on the string secured to the machine head;

three LEDs positioned about the head and secured to the headstock, a first LED indicating the string is in tune, a second LED indicating the string is flat, and a third LED indicating the string is sharp, wherein the guitar is tuned by picking the string and adjusting the tuning peg until first LED indicates the string is in tune.

5. The self teaching apparatus for training a user to play a guitar of claim 1, wherein the guitar body, fret board and neck comprise a transparent material selected from the group consisting of fiberglass, plastic, polymer.

6. The self teaching apparatus for training a user to play a guitar of claim 1, wherein the guitar fret board comprises any of transparent plastic, fiberglass or polymer.

7. The self teaching apparatus for training a user to play a guitar of claim 1, wherein each light emitting transparent panel is configured to be are selectively illuminated in a color selected from a plurality of colors, wherein the illuminating color indicates which finger to depress on the fret during guitar play.

8. The self teaching apparatus for training a user to play a guitar of claim 7, wherein the light emitting transparent panels are electronically selectable to illuminate in blue, green, yellow, and red, wherein blue indicates index finger, green indicates middle finger, yellow indicates ring finger and red indicates pinky finger.

9. The self teaching apparatus for training a user to play a guitar of claim 1, further comprising a plurality of backlit LCD displays, wherein each fret has a LCD display associated with it, wherein the LCD display are secured to a side of the fret board proximate to its associated fret, wherein each LCD display and its backlight are electronically interfaced to the electronic logic system.

10. The self teaching apparatus for training a user to play a guitar of claim 1, further comprising a plurality of backlit screens, wherein each fret has a backlit screen associated with it, wherein the backlit screens are secured within the fret board in spaces between the frets, wherein each backlit screen is electronically selectable to illuminate in blue, green, yellow, and red, wherein blue indicates index finger, green indicates middle finger, yellow indicates ring finger and red indicates pinky finger.

11. The self teaching apparatus for training a user to play a guitar of claim 10, wherein the backlit screens are backlit graphic LCD screens.

12. The self teaching apparatus for training a user to play a guitar of claim 1, wherein the backlit graphic screen is tiltably secured to the body, the backlit graphic screen tiltable for viewing by the user playing the guitar.

13. The self teaching apparatus for training a user to play a guitar of claim 5, wherein the backlit graphic screen is secured internally in the body of the guitar and aligned for viewing by the user playing the guitar.

* * * * *